3,806,511
1-(3-PYRIDYL)-2-BENZYLTHIO-3-LOWERALKYL-ISOTHIO UREAS AND DERIVATIVES THEREOF
Shizuya Tanaka, Minoo, Sigeo Yamamoto, Toyonaka, and Katsutoshi Tanaka and Hisami Takeda, Takarazuka, Japan, assignors to Sumitomo Chemical Company, Limited
No Drawing. Filed Apr. 27, 1972, Ser. No. 248,041
Claims priority, application Japan, Apr. 30, 1971, 46/29,087
Int. Cl. C07d 31/50
U.S. Cl. 260—294.8 G
10 Claims

ABSTRACT OF THE DISCLOSURE

An isothiourea compound of the formula:

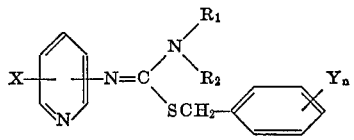

wherein $R_1$ and $R_2$ are each a hydrogen atom, an alkyl group, a cyano(lower)alkyl group, a lower alkenyl group, a lower alkynyl group or a phenyl(lower)alkyl group substituted or not with lower alkyl, nitro and/or halogen on the benzene ring or, when taken together with the adjacent nitrogen atom, $R_1$ and $R_2$ represent a 3 to 6-membered nitrogen-containing cyclic group including or not an additional hetero atom (excluding the case where both $R_1$ and $R_2$ are hydrogen), X is a hydrogen atom, a halogen atom or a lower alkyl group, Y is a hydrogen atom, a halogen atom, a nitro group or a lower alkyl group and $n$ is an integer of 1 to 3, which is useful as an agricultural chemical such as a fungicidal agent or an acaricidal agent and can be prepared by reacting a thiourea compound of the formula:

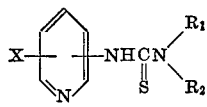

wherein $R_1$, $R_2$ and X are each as defined above with a benzyl halide of the formula:

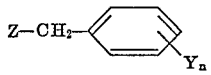

wherein Z is a halogen atom and Y and $n$ are each as defined above.

---

The present invention relates to novel isothiourea compounds and their production and use.

In this specification, the term "lower" is intended to mean groups having 1 to 5 carbon atoms.

The said isothiourea compounds are representable by the formula:

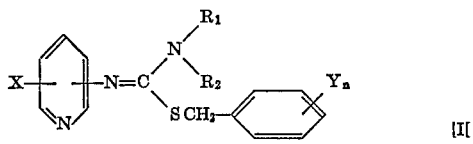

wherein $R_1$ and $R_2$ are each a hydrogen atom, a $C_1$-$C_{20}$ alkyl group, a cyano(lower)alkyl group (e.g. cyanomethyl, cyanomethyl), a lower alkenyl group (e.g., allyl, butenyl), a lower alkynyl group (e.g. propargyl) or a phenyl(lower)alkyl group (e.g. benzyl, phenethyl) substituted or not with lower alkyl, nitro and/or halogen on the benzene ring or, when taken together with the adjacent nitrogen atom, $R_1$ and $R_2$ represent a 3 to 6-membered nitrogen-containing cyclic group including or not an additional hetero atom (e.g. pyrrolidino, piperidino, morpholino) (excluding the case where both $R_1$ and $R_2$ are hydrogen), X is a hydrogen atom, a halogen atom (e.g. chlorine, bromine, iodine, fluorine) or a lower alkyl group (e.g. methyl, ethyl, propyl, isopropyl, butyl), Y is a hydrogen atom, a halogen atom (e.g. chlorine, bromine, iodine, fluorine), a nitro group or a lower alkyl group (e.g. methyl, ethyl, propyl, isopropyl, butyl) and $n$ is an integer of 1 to 3.

The isothiourea Compounds I are useful as agricultural chemicals. For instance, they exhibit a high antimicrobial activity against a wide variety of phyto-pathogenic bacteria and fungi (e.g. *Xanthomonas oryzae*, *Pyricularia oryzae*, *Pellicularia sasakii*, Gloeosporium sp., Colletotrichum sp.). Their remarkable potency against Erisiphaceae microorganisms is particularly notable. Further, for instance, they produce a marked inhibition of the growth of acarids parasitic to crop plants. Thus, they can be used for prevention and treatment of the plant diseases caused by bacteria and fungi and also for extermination of acarids.

According to the present invention, the isothiourea Compounds I can be produced by reacting a thiourea compound of the formula:

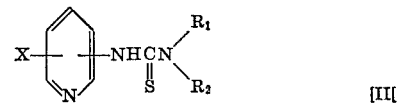

wherein $R_1$, $R_2$ and X are each as defined above with a benzyl halide of the formula:

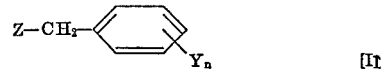

wherein Z is a halogen atom and Y and $n$ are each as defined above.

The reaction may be carried out by treatment of the thiourea Compound II with the benzyl halide [III] in the presence of a basic substance such as alkali metal hydroxide (e.g. sodium hydroxide, potassium hydroxide), alkali metal alkoxide (e.g. sodium methoxide, potassium methoxide, sodium ethoxide) or alkaline earth metal hydroxide (e.g. calcium hydroxide) in an inert solvent (e.g. methanol, ethanol, tetrahydrofuran, dioxane, dimethylsulfoxide, dimethylformamide), usually at a temperature from 0 to 100° C. for about 1 to 4 hours. The preferred proportion of the thiourea Compound II, the benzyl halide [III] and the basic substance may be 1:1–2:1–1.5 by mol.

After the reaction is completed, the reaction mixture is poured into water, and the produced crystals or oil are collected by filtration or extraction with a water-immiscible organic solvent (e.g. benzene, toluene, ethyl acetate, ether) to give the objective isothiourea Compound I.

Some typical examples of the thiourea Compound II are as follows:

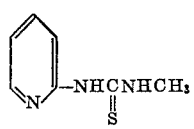
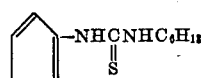
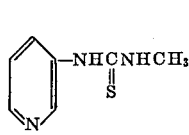
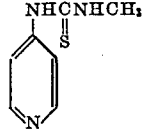

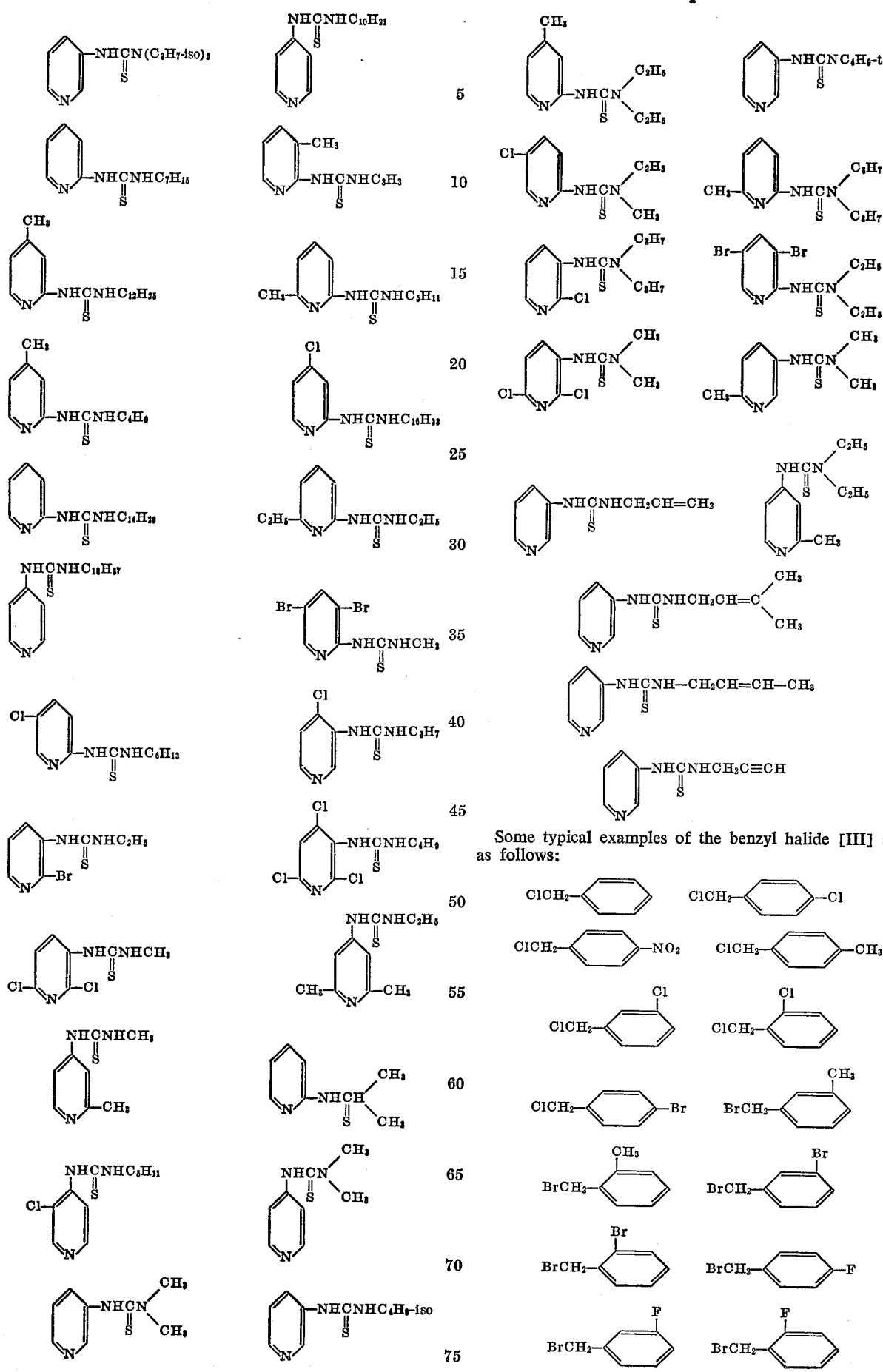
Some typical examples of the benzyl halide [III] are as follows:
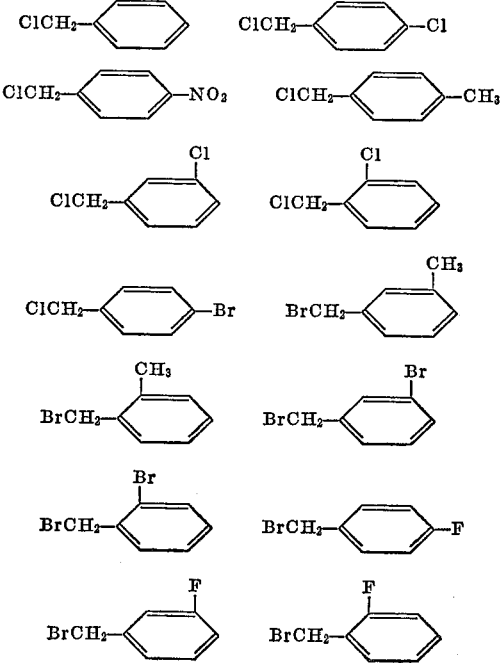

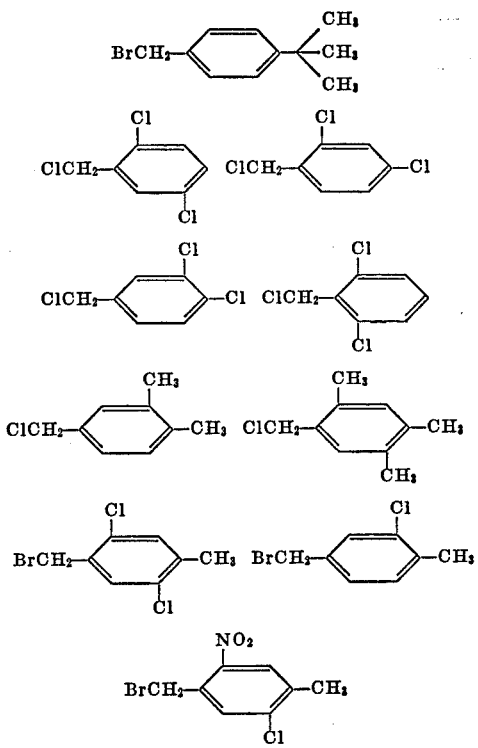

Some practical procedures for the preparation of the isothiourea Compound I are shown in the following examples. It is apparent that the invention is not limited to these precise methods and that changes can be made therein without departing substantially from the instant invention.

EXAMPLE 1

To a solution of potassium hydroxide (0.1 mol) in methanol (50 ml.), 1-(3'-pyridyl)-3-t-buylthiourea (0.1 mol) is added at 15° C., and p-chlorobenzyl chloride (0.11 mol) is dropwise added thereto during which the reactor is cooled with water so as to prevent generation of heat. Toward the end of the addition, precipitates of potassium chloride appear. The mixture is stirred at 25° C. for 2 hours and poured into water (200 ml.). The oil layer is extracted with ethyl acetate (100 ml.), and the extract is washed with an aqueous saturated solution of sodium chloride, dried over anhydrous sodium sulfate and concentrated under reduced pressure. The residual oily substance is admixed with benzene (50 ml.), and the mixture is stirred at 15° C. for 1 hour. The precipitated white crystals are collected by filtration and dried to give 1-(3'-pyridyl)-2-p-chlorobenzyl-3-t-butylisothiourea (30.1 g.).

EXAMPLE 2

In methanol (30 ml.) containing sodium methoxide (0.1 mol), 1 - (3' - pyridyl) - 3,3 - diisopropylthiourea isopropylamine is dissolved, and, 2,4-dichlorobenzyl chloride (0.11 mol) is dropwise added thereto at 10° C. After completion of the addition, the mixture is allowed to stand at 20° C. for 1.5 hours, and then ice-water (150 ml.) is added thereto. The mixture is extracted with ether (200 ml.), and the extract is washed with an aqueous saturated solution of sodium chloride, dried over anhydrous sodium sulfate and concentrated under reduced pressure. The residue is admixed with n-hexane (100 ml.) at 10° C., an the mixture is stirred for about 1 hour to give 1-(3'-pyridyl)-2-(2'',4''-dichlorobenzyl)-3,3 - diisopropylisothiourea (33 g.) as white needles.

In the similar manner as in Example 1 or 2, there are prepared various isothiourea Compounds I, some of which are shown in Table 1.

TABLE 1

| Compound number | Structure | Physical constant |
|---|---|---|
| 1 | [structure] | M.P., 103–104° C. |
| 2 | [structure] | M.P., 123–124° C. |
| 3 | [structure] | M.P., 113–114° C. |
| 4 | [structure] | M.P., 98.5–100° C. |
| 5 | [structure] | M.P., 98–100° C. |

TABLE 1—Continued

| Compound number | Structure | Physical constant |
|---|---|---|
| 6 | 3-pyridyl-N=C(NHC$_2$H$_5$)(SCH$_2$-C$_6$H$_3$-2,4-Cl$_2$) | M.P., 88–89° C. |
| 7 | 3-pyridyl-N=C(NHC$_2$H$_5$)(SCH$_2$-C$_6$H$_4$-4-C(CH$_3$)$_3$) | M.P., 89.5–90.5° C. |
| 8 | 3-pyridyl-N=C(NH-CH$_2$-CH(CH$_3$)$_2$)(SCH$_2$-C$_6$H$_4$-4-Cl) | M.P., 92–93° C. |
| 9 | 3-pyridyl-N=C(NHCH$_2$CH(CH$_3$)$_2$)(SCH$_2$-C$_6$H$_4$-3-Cl) | M.P., 80–81° C. |
| 10 | 3-pyridyl-N=C(NHC(CH$_3$)$_3$)(SCH$_2$-C$_6$H$_4$-4-Cl) | M.P., 115.5–116.5° C. |
| 11 | 3-pyridyl-N=C(NHCH$_2$CH=CH$_2$)(SCH$_2$-C$_6$H$_4$-4-Cl) | M.P. 95–96° C. |
| 12 | 3-pyridyl-N=C(NHCH$_2$CH=CH$_2$)(SCH$_2$-C$_6$H$_4$-4-C(CH$_3$)$_3$) | M.P., 79.5–81° C. |
| 13 | 3-pyridyl-N=C(N(CH$_3$)$_2$)(SCH$_2$-C$_6$H$_5$) | $n_D^{23}$, 1.6200. |
| 14 | 3-pyridyl-N=C(N(CH$_3$)$_2$)(SCH$_2$-C$_6$H$_4$-Cl) | $n_D^{19}$, 1.6205. |
| 15 | 3-pyridyl-N=C(N(CH$_2$CH$_2$CN)$_2$)(SCH$_2$-C$_6$H$_4$-Cl) | $n_D^{20}$, 1.6130. |
| 16 | 3-pyridyl-N=C(N(C$_2$H$_5$)$_2$)(SCH$_2$-C$_6$H$_5$) | $n_D^{23}$, 1.6115. |
| 17 | 3-pyridyl-N=C(N(C$_2$H$_5$)$_2$)(SCH$_2$-C$_6$H$_4$-F) | $n_D^{21}$, 1.5980. |

TABLE 1—Continued

| Compound number | Structure | Physical constant |
|---|---|---|
| 18 | 3-pyridyl-N=C(N(C₂H₅)₂)(SCH₂-C₆H₄-Cl (p)) | $n_D^{19}$, 1.6157. |
| 19 | 3-pyridyl-N=C(N(C₂H₅)₂)(SCH₂-C₆H₄-CH₃ (p)) | $n_D^{22}$, 1.6035. |
| 20 | 3-pyridyl-N=C(N(C₂H₅)₂)(SCH₂-C₆H₄-NO₂ (p)) | $n_D^{22}$, 1.6256. |
| 21 | 3-pyridyl-N=C(N(C₂H₅)₂)(SCH₂-C₆H₄-Cl (o)) | $n_D^{22}$, 1.6158. |
| 22 | 3-pyridyl-N=C(N(i-C₃H₇)₂)(SCH₂-C₆H₅) | M.P., 41.5–43.0° C. |
| 23 | 3-pyridyl-N=C(N(i-C₃H₇)₂)(SCH₂-C₆H₄-F (p)) | M.P., 70–71.5° C. |
| 24 | 3-pyridyl-N=C(N(i-C₃H₇)₂)(SCH₂-C₆H₄-Cl (p)) | M.P., 77.5–79° C. |
| 25 | 3-pyridyl-N=C(N(i-C₃H₇)₂)(SCH₂-C₆H₄-Br (p)) | M.P., 81.5–82.5° C. |
| 26 | 3-pyridyl-N=C(N(i-C₃H₇)₂)(SCH₂-C₆H₄-CH₃ (p)) | M.P., 76.5–77.5° C. |
| 27 | 3-pyridyl-N=C(N(i-C₃H₇)₂)(SCH₂-C₆H₄-C(CH₃)₃ (p)) | M.P., 100–101.5° C. |
| 28 | 3-pyridyl-N=C(N(i-C₃H₇)₂)(SCH₂-C₆H₄-NO₂ (p)) | M.P., 108–109° C. |
| 29 | 3-pyridyl-N=C(N(i-C₃H₇)₂)(SCH₂-C₆H₄-Cl (o)) | $n_D^{22}$, 1.6015. |
| 30 | 3-pyridyl-N=C(N(i-C₃H₇)₂)(SCH₂-C₆H₃-Cl₂ (2,4)) | M.P., 60–62° C. |

TABLE 1—Continued

| Compound number | Structure | Physical constant |
|---|---|---|
| 31 | Pyridine-N=C(N(i-C$_4$H$_9$)$_2$)(SCH$_2$-C$_6$H$_4$-Cl) | $n_D^{22}$, 1.5858. |
| 32 | Pyridine-N=C(N(CH$_2$-CH$_2$)(CH$_2$-CH$_2$)CH)(SCH$_2$-C$_6$H$_4$-Cl) | $n_D^{22}$, 1.6300. |
| 33 | Pyridine-N=C(N(CH$_2$-CH$_2$)(CH$_2$-CH$_2$)O)(SCH$_2$-C$_6$H$_4$-Cl) | $n_D^{22}$, 1.6330 |

As the agricultural chemical, the isothiourea Compound I may be used alone. For the practical use, however, it is usually extended with a suitable carrier or diluent, if desired, by the aid of any emulsifier to formulate a preparation as conventionally employed in this art field such as pellets, dust, wettable powder, or emulsifiable concentrate.

Examples of the solid carrier or diluent are talc, bentonite, clay, kaolin, diatomaceous earth, vermiculite, calcium hydroxide, etc. Examples of the liquid carrier or diluent are benzene, alcohols, acetone, xylene, dioxane, methylnaphthalene, cyclohexanone, etc. As the emulsifier, there may be employed alkylsulfates, alkylsulfonates, arylsulfonates, polyethyleneglycol ethers, polyvalent alcohol esters and the like.

When desired, the preparation may contain any other active ingredient such as a fungicide, an insecticide, a lanatoside, a herbicide or a fertilizer.

Some specific embodiments of the preparation comprising the isothiourea Compound I as the active ingredient are shown in the following examples where parts are by weight.

EXAMPLE A

Wettable powder

The isothiourea Compound I No. 20 (50 parts), a wetting agent (alkylbenzenesulfonate) (5 parts) and diatomaceous earth (45 parts) are pulverized and mixed well to make a wettable powder.

EXAMPLE B

Wettable powder

The isothiourea Compound I No. 27 (10 parts), a wetting agent (alkylbenzenesulfonate) (5 parts) and diatomaceous earth (85 parts) are pulverized and mixed well to make a wettable powder.

EXAMPLE C

Dust

The isothiourea Compound I No. 1 (7 parts) and clay (93 parts) are pulverized and mixed well to make a dust.

EXAMPLE D

Dust

The isothiourea Compound I No. 30 (2 parts) and clay (98 parts) are pulverized and mixed well to make a dust.

EXAMPLE E

Pellets

The isothriourea Compound I No. 43 (8 parts), bentonite (35 parts), clay (52 parts) and sodium ligninsulfonate (5 parts) are pulverized and mixed well. The mixture is kneaded with water and pelletized to make pellets.

EXAMPLE F

Emulsifiable concentrate

The isothiourea Compound I No. 3 (20 parts), an emulsifier (polyoxyethyleneglycol ether) (15 parts) and cyclohexanone (65 parts) are mixed well to make an emulsifiable concentrate.

EXAMPLE G

Emulsifiable concentrate

The isothiourea Compound I No. 12 (50 parts), an emulsifier (polyoxyethyleneglycol ether) (15 parts) and cyclohexanone (65 parts) are mixed well to make an emulsifiable concentrate.

EXAMPLE H

Granules

The isothiourea Compound I No. 8 (5 parts), clay (93.5 parts) and a binder (polyvinyl alcohol) are sufficiently pulverized and mixed together. The resulting mixture is kneaded with water, granulated and dried to obtain granules containing 5% of the active ingredient. The granules may be applied as such.

EXAMPLE I

Composite wettable powder

The isothiourea Componnd I No. 24 (20 parts), 1,2-bis[(3-methoxycarbonyl)thioureido]benzene (10 parts), zinc ethylenebisdithiocarbamate (10 parts), calcium alkylbenzenesulfonate (5 parts) and diatomaceous earth (55 parts) are sufficiently pulverized and mixed together to obtain a wettable powder containing 40% of the active ingredients.

EXAMPLE J

Composite dust

The isothiourea Compound I No. 31 (2 parts), O,O-dimethyl-O-(3-methyl-4-nitrophenyl)phosphorothioate (2 parts) and clay (96 parts) are sufficiently pulverized and mixed together to obtain a dust containing 4% of the active ingredients. The dust may be applied as such.

The following test data support the fungicidal and acaricidal activities of the isothiourea Compound I.

On the basis of the degree of damage, the degree of disease-preventing effect of the test compound was determined.

The results are shown in Table 2.

TABLE 2

| Compound number: | Concentration (p.p.m.) | Number of seed leaves | Degree of damage, percent | Degree of disease-preventing effect |
|---|---|---|---|---|
| 1 | 500 | 12 | 7.5 | 93 |
| 2 | 500 | 12 | 5.0 | 95 |
| 5 | 500 | 12 | 3.0 | 97 |
| 10 | 500 | 12 | 1.0 | 99 |
| 11 | 500 | 12 | 2.0 | 98 |
| 16 | 500 | 12 | 1.0 | 99 |
| 17 | 500 | 12 | 5.0 | 95 |
| 18 | 500 | 12 | 2.0 | 98 |
| 24 | 500 | 12 | 0 | 100 |
| 30 | 500 | 12 | 0 | 100 |
| 31 | 500 | 12 | 1.0 | 99 |
| 32 | 500 | 12 | 2.5 | 98 |
| 33 | 500 | 12 | 2.0 | 98 |
| Control | 500 | 12 | 65.3 | 35 |
| 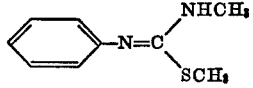 | | | | |
| Control | 200 | 12 | 12.7 | 87 |
| 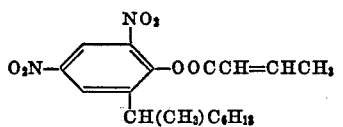 | | | | |
| Untreated | | 12 | 100 | |

TEST 1

Powdery mildew controlling effects

The test compound in the form of an emulsifiable concentrate preparation was applied to seed leaves of cucumbers cultured in pots of 9 cm. in diameter and nipped off the first leaf when developed at a rate of 10 ml. of the concentrate per pot by the use of a spray gun. After 24 hours, a spore suspension of *Sphaerotheca fuliginea* was sprayed on the plants, and the pots were left in a room at 28° C. in a himidity of 60 to to 80% for 14 days. Then, the infectious state of the seed leaves was observed, and the degree of damage was calculated according to the following equation:

$$\text{Degree of damage} = \frac{\Sigma\left(\substack{\text{Infectious} \\ \text{index}} \times \substack{\text{Number of} \\ \text{seed leaves}}\right)}{\text{Total number of seed leaves} \times 5} \times 100$$

wherein the infectious index was determined by the following criteria:

Infections index:  Infectious state
 0 ............ No infectious spot.
 1 ............ Infectious spots only at or around the inoculated place.
 2 ............ Infectious spots in about one-fifth of the inoculated seed leaf.
 3 ............ Infectious spots in about two-fifths of the inoculated seed leaf.
 4 ............ Infectious spots in about three-fifths of the inoculated seed leaf.
 5 ............ Infectious spots in four-fifths or more of the inoculated seed leaf.

TEST 2

Sheath blight controlling effects

The test compound in the form of an emulsifiable concentrate preparation was applied to rice plants cultured in pots of 9 cm. in diameter and grown up to 50 cm. tall at a rate of 10 ml. of the concentrate per pot by the use of a spray gun. After 4 hours, a mycelium-disc-inoculum (5 mm. in diameter) of *Pellicularia sasakii* cultured on PS synthetic medium was inoculated on the sheath, and the plants were placed into a room at 28° C. Four days thereafter, the infectious state at the sheath was observed, and the size of the diseased spot was measured. The degree of damage and the degree of disease-preventing effect of the test compound were calculated according to the following equations, respectively:

$$\text{Degree of damage} = \frac{\Sigma\left(\substack{\text{Infectious} \\ \text{index}} \times \substack{\text{Number of} \\ \text{stems}}\right)}{\text{Total number of stems} \times 3} \times 100$$

wherein the infectious index was determined on the following criteria:

Infectious index:  Infectious state
 0 ...... No infectious spots on sheath.
 1 ...... Infectious spot-like parts.
 2 ...... Infectious spots of less than 3 cm. in size.
 3 ...... Infectious spots of not less than 3 cm. in size.

Degee of disease-preventing effect $$= \frac{\left(\substack{\text{Degree of damage in} \\ \text{untreated plot}}\right) - \left(\substack{\text{Degree of damage in} \\ \text{treated plot}}\right)}{\text{Degee of damage in untreated plot}}$$

The results are shown in Table 3.

TABLE 3

| Compound number: | Concentration (p.p.m.) | Number of stems | Degree of damage | Degree of disease-preventing effect |
|---|---|---|---|---|
| 1 | 500 | 20 | 5.0 | 95 |
| 2 | 500 | 20 | 1.0 | 99 |
| 5 | 500 | 20 | 1.0 | 99 |
| 10 | 500 | 20 | 1.0 | 99 |
| 13 | 500 | 20 | 0.0 | 100 |
| 16 | 500 | 20 | 3.0 | 97 |
| 21 | 500 | 20 | 1.0 | 99 |
| 24 | 500 | 20 | 0.0 | 100 |
| 30 | 500 | 20 | 1.0 | 99 |
| 31 | 500 | 20 | 2.0 | 98 |
| 33 | 500 | 20 | 3.0 | 97 |
| Control | 500 | 20 | 4.3 | 96 |

$$\left(\begin{matrix}CH_3\\ \\CH_3\end{matrix}\hspace{-4pt}N\hspace{-4pt}\begin{matrix}S\\ \| \\C\end{matrix}\hspace{-4pt}S\right)_2 AsCH_3$$

$+$ $$\left(\begin{matrix}CH_3\\ \\CH_3\end{matrix}\hspace{-4pt}N\hspace{-4pt}\begin{matrix}S\\ \| \\C\end{matrix}\hspace{-4pt}S\right)_2$$

$+$ $$\left(\begin{matrix}CH_3\\ \\CH_3\end{matrix}\hspace{-4pt}N\hspace{-4pt}\begin{matrix}S\\ \| \\C\end{matrix}\hspace{-4pt}S\right)_2 Zn$$

| Untreated | | 20 | 100 | |

TEST 3

Rice blast controlling effects

The test compound in the form of an emulsifiable concentrate preparation was applied to rice plants cultured in pots of 9 cm. in diameter and grown up to the four leaved stage at a rate of 7 ml. of the concentrate per pot by the use of a spray gun. After 24 hours, the plants were sprayed to inoculate thereon with a spore suspension of *Pyricularia oryzae* cultured in an oatmeal medium. The plants were placed in a room at 26° C. in a humidity of above 90%. Three days thereafter, the number of diseased spots at the top leaf was counted, and the degree of disease-preventing effect of the test compound was calculated according to the following equation:

Degree of disease-preventing effect $$= \frac{\left(\begin{matrix}\text{Number of infectious}\\ \text{spots in untreated plot}\end{matrix}\right) - \left(\begin{matrix}\text{Number of infectious}\\ \text{spots in treated plot}\end{matrix}\right)}{\text{Number of infectious spots in untreated plot}}$$

The results are shown in Table 4.

TABLE 4

| Compound number: | Concentration (p.p.m.) | Number of leaves | Infectious spots per leaf | Degree of disease-preventing effect |
|---|---|---|---|---|
| 1 | 500 | 15 | 3.3 | 95 |
| 2 | 500 | 15 | 9.6 | 84 |
| 3 | 500 | 15 | 0.0 | 100 |
| 5 | 500 | 15 | 2.2 | 96 |
| 11 | 500 | 15 | 9.0 | 85 |
| 14 | 500 | 15 | 6.0 | 90 |
| 17 | 500 | 15 | 5.0 | 92 |
| 18 | 500 | 15 | 3.0 | 95 |
| 21 | 500 | 15 | 0.8 | 99 |
| 24 | 500 | 15 | 0.1 | 100 |
| 30 | 500 | 15 | 1.5 | 98 |
| 31 | 500 | 15 | 8.0 | 87 |
| 32 | 500 | 15 | 6.2 | 90 |
| Control | 500 | 15 | 6.1 | 90 |
| O,O-diethyl-S-benzylphosphorothiolate. | | | | |
| Untreated | | 15 | 61.0 | |

TEST 4

Effects against two spotted spider mites

Mottled kidney beans cultured in pots and grown up to the two leaved stage (9 days after seeding) were each parasitized by 20 to 30 mites per leaf and left in a room at 27° C. for a week, at the end of which a large number of mites at various growth stages were observed. The test compound in the form of a wettable powder preparation was diluted with water, and the dilution was applied to the plants on a turn table at a rate of 10 ml. per pot. Ten days thereafter, the infectious state of the plants and the breeding state of mites were observed, and the degree of damage of mottled kidney beans and the degree of breeding of mites were determined respectively according to the following criteria:

Degree of damage:

| | State |
|---|---|
| $-$ | No infection. |
| $++++$ | Complete withering. |

Three grades were provided between the degrees ($-$) and ($++++$).

Degree of breeding:

| | State |
|---|---|
| $-$ | Ten or less mites alive. |
| $++++$ | Innumerable mites alive in a nest. |

Three grades were provided between the degrees ($-$) and ($++++$).

The results are shown in Table 5.

TABLE 5

| Compound number: | Degree of damage | Degree of breeding |
|---|---|---|
| 1 | ++ | + |
| 9 | + | + |
| 11 | + | + |
| 16 | + | ++ |
| 32 | ++ | + |
| Control | + | + |

$$\begin{array}{c} CH_3O \\ \phantom{CH_3O}\diagdown \\ CH_3O \diagup \end{array} \overset{S}{\underset{\|}{P}} - S - CH_2 \overset{O}{\underset{\|}{C}} N \begin{array}{c} H \\ \diagup \\ \diagdown \\ CH_3 \end{array}$$

| Control | + | ++ |

$$CH_3 - \underset{\underset{CH_3}{|}}{\overset{\overset{CH_3}{|}}{C}} - \underset{}{\bigcirc} - OCH_2 \underset{\underset{CH_3}{|}}{CH} OCH_2 \underset{\underset{CH_3}{|}}{CH} O\overset{O}{\underset{\|}{S}} OC_2H_4Cl$$

| Untreated | ++++ | ++++ |

What is claimed is:
1. An isothiourea compound of the formula:

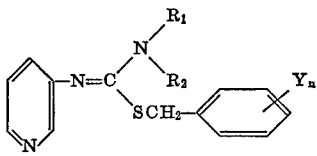

wherein $R_1$ and $R_2$ are each a hydrogen atom, a $C_1$–$C_4$ straight or branched alkyl group, a cyanoalkyl group in which the alkyl moiety has 1 or 2 carbon atoms, an allyl group or a propargyl group or, $R_1$ and $R_2$ when taken together with the adjacent nitrogen atom represent a 3 to 6-membered saturated cyclic group, Y is a hydrogen atom, a halogen atom, a nitro group or a $C_1$–$C_4$ straight or branched alkyl group and $n$ is an integer of 1 to 3.

2. An isothiourea compound of the formula:

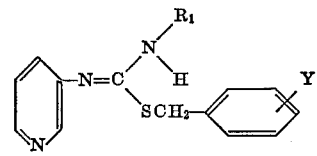

wherein $R_1$ is a $C_1$–$C_4$ straight or branched alkyl group, an allyl group or a propargyl group and Y is a halogen atom or a $C_1$–$C_4$ straight or branched alkyl group.

3. An isothiourea compound of the formula:

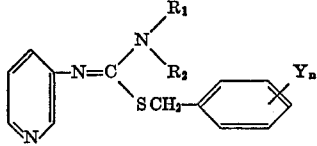

wherein $R_1$ and $R_2$ are each a $C_1$–$C_4$ straight or branched alkyl group, Y is a halogen atom or a $C_1$–$C_4$ straight or branched alkyl group and $n$ is 1 or 2.

4. An isothiourea compound of the formula:

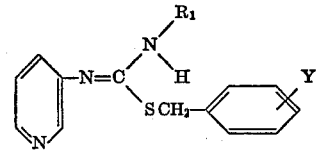

wherein $R_1$ is a $C_1$–$C_4$ straight or branched alkyl group and Y is a halogen atom.

5. An isothiourea compound of the formula:

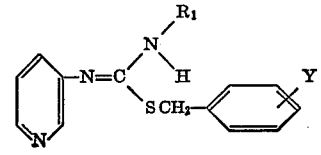

wherein $R_1$ is a $C_1$–$C_4$ straight or branched alkyl group and Y is a $C_1$–$C_4$ straight or branched alkyl group.

6. An isothiourea compound of the formula:

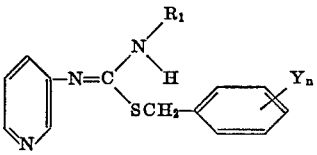

wherein $R_1$ is a $C_1$–$C_4$ straight or branched alkyl group, Y is a halogen atom and $n$ is 2.

7. An isothiourea compound of the formula:

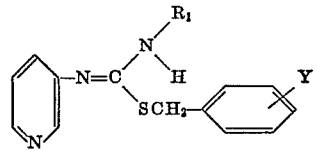

wherein $R_1$ is a $C_1$–$C_4$ straight or branched alkyl group and Y is a t-butyl group.

8. An isothiourea compound of the formula:

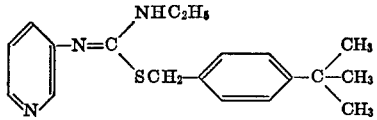

9. An isothiourea compound of the formula:

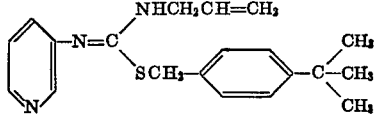

10. An isothiourea compound of the formula:

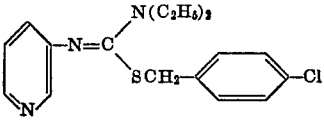

References Cited
UNITED STATES PATENTS
3,736,331  5/1973  Black et al. _____ 260—309

OTHER REFERENCES
Karrer: Organic Chemistry, 4th English ed., p. 928, Elsevier Pub. Co. (New York), 1950.

ALAN L. ROTMAN, Primary Examiner

U.S. Cl. X.R.

260—247.1, 293.69, 294.8 H, 294.8 E; 424—248, 263, 266